Oct. 16, 1962    J. A. HILL ET AL    3,058,771
COMBINED TRACTOR SEAT, FENDERS, AND TOOL BOX
Filed March 3, 1961
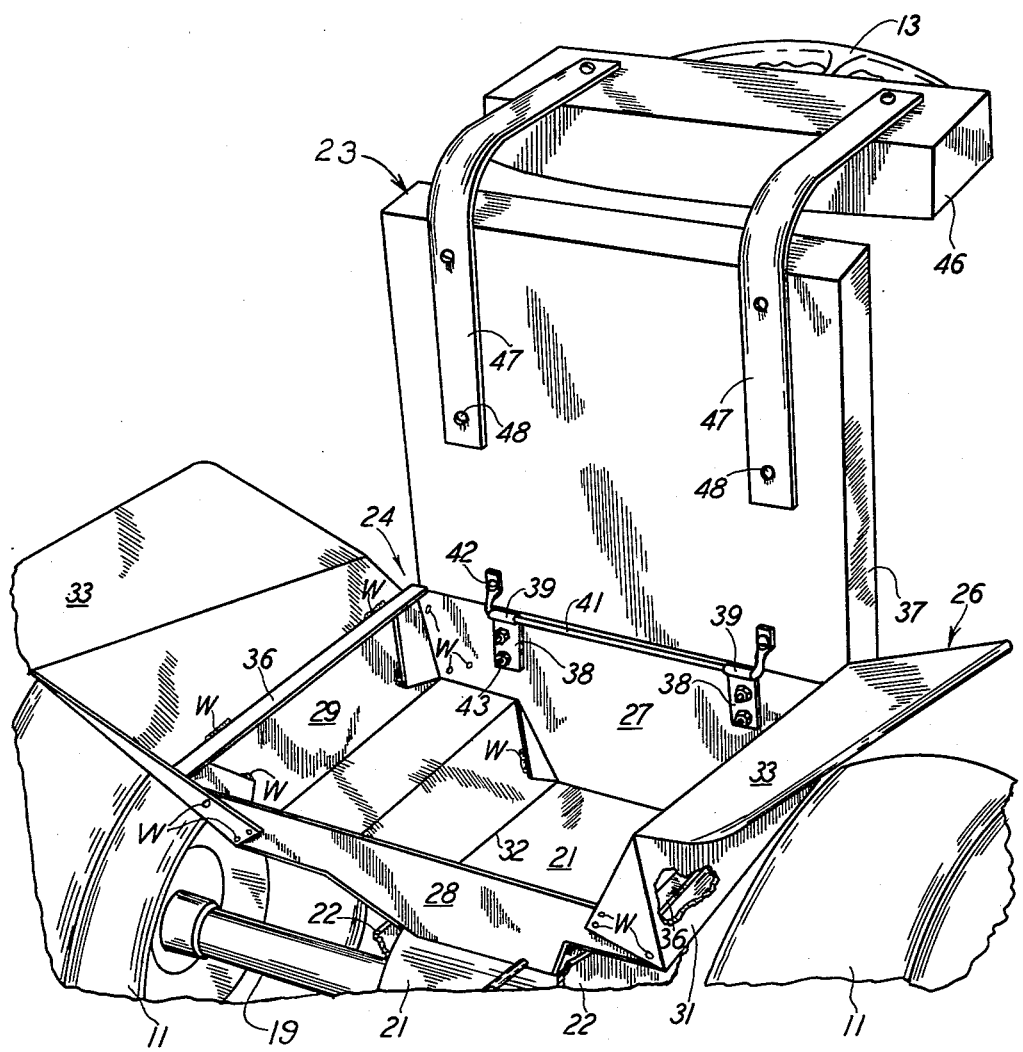
INVENTORS:
JOSEPH A. HILL
KNUD H. HOFFMEYER
BY Arthur J. Hansmann
ATTORNEY 3,058,771
COMBINED TRACTOR SEAT, FENDERS, AND TOOL BOX
Joseph A. Hill, Glen Ellyn, Ill., and Knud H. Hoffmeyer, Racine, Wis., assignors to Jacobsen Manufacturing Company, Racine, Wis., a corporation of Wisconsin
Filed Mar. 3, 1961, Ser. No. 93,230
4 Claims. (Cl. 296—37)

This invention relates to a tractor or the like, and more especially, it relates to a combined tractor seat, tool box and fenders.

It is an object of this invention to provide a generally improved combination of a tractor seat, tool box and fenders, and to do so in an economical but yet sturdy construction. In accomplishing this particular object, the combination is both economical and sturdy, even though it is simplified from heretofore known constructions, in that it is made by utilizing the differential housing of the tractor and by providing sides to the tool box such that they extend from the differential housing upwardly beyond the seat and then laterally over the tractor wheels to also serve as fenders.

Another object of this invention is to provide a combined tractor seat and storage or tool box wherein the seat is supported on the box in the lowered position and thereby serves as the top or cover for the box, and whereby the seat is swingable to an open or raised position for accessibility to the tool box.

Still another object of this invention is to provide a combined storage or tool box, seat, and fender combination, wherein the combination is highly efficient in both the arrangement of the various parts and in the accessibility to the tool box and the safety and comfort provided by the position of the seat with respect to the fenders.

Other objects and advantages will become apparent upon reading the following description in light of the accompanying drawing wherein:

The drawing is an enlarged perspective view of the fragment of a tractor, and showing the seat in the raised position.

The drawing generally shows a tractor having the usual rear wheels 11 for supporting a chassis or frame (not shown) to which a conventional steering wheel 13 is suitably mounted as of course a part of the tractor as shown. Further, a conventional rear axle 19 is disposed between the rear wheels 11 and thus the differential housing 21 is further shown intermediate the axle 19 and of course, intermediate the wheels 11. At this time it will also be noted that the axle 19 has two spaced-apart plates 22 extending transverse thereto and flanking the housing 21 to serve as a part of the housing 21, namely the opposite sides thereof.

The important elements of this construction reside in the provision of the seat, generally designated 23, tool box, generally designated 24, and fenders, generally designated 26. It will of course be noted that the combination of these parts 23, 24, and 26 are assembled together, in a manner hereinafter described, and they are of course disposed intermediate the rear wheels 11 and immediately above the differential housing 21.

The drawing shows the differential housing 21 serving as the bottom or base of the tool box 24, and plate-like members 27 and 28 respectively serving as the front and rear of the tool box 24. Further, left and right, with respect to forward direction of the tractor, members or plates 29 and 31 respectively serve as the left and right sides of the tool box 24 and also the left and right fenders of the tractor. At this time it will therefore be understood that the members 29 and 31 are shaped in the irregular pattern shown so that these one-piece members extend from their bottom lines, such as the line or edge designated 32, upwardly through the sides of the tool box and they continue on to their lateral position above the rear wheels 11 through the fender portion designated 33 of the continuous pieces 29 and 31. With this arrangement, the sides of the tool box are provided as desired, and also of course the fenders 33 are provided, and this is all accomplished by means of the one-piece structure which is therefore inexpensive in both material cost and also in labor cost of assembling the two pieces into the combination mentioned. Further, the tool box and fender construction is sturdy since only one piece of plate member or the like is utilized and therefore no additional pieces and bolting thereof are required in the construction, and this is significant from the strength standpoint mentioned, regarding pieces 29 and 31.

The drawing also shows that pieces 28 and 29 and 31 are spot welded together at spots designated "W," and thus these pieces are of course readily and sturdily secured together. It will of course be understood and obvious that piece 27 and the opposite ends of pieces 29 and 31 are similarly welded together. One additional weldment is shown with respect to piece 27 and the box one side, or piece 29, and that is the weldment indicated immediately above the lower edge 32 of the piece 29, and it will of course be understood that a similar shape and welding would exist on the unshown corner of piece 27 as well as on the similar corners of piece 28 on the inside thereof. Such additional or complete showing is not at all necessary for a full understanding of the invention, and the following will be readily apparent to one skilled in the art.

Also, side rails or seat support bars 36, such as the one shown bar 36, are respectively disposed adjacent to the pieces 29 and 31 on the inside surfaces thereof, and the bars 36 extend between the upper edges of the pieces 27 and 28. Here also, weldments indicated at "W" are placed between the pieces 29 and 31 and their respective bars 36 for securing these pieces together in the sturdy position shown.

At this time it will further be noted that the lower edge 32 of the piece 29 extends to the inside of the plate 22 so that the member 29 is of course secure between the plate 22 and the edges of the members 27 and 28 as shown. This further simplifies the construction but yet provides for the sturdiness desired, and it will also be understood that the same construction exists with respect to the member 31. With regard to the seat 23, it will be noted that the seat portion 37 is hingedly mounted on the front 27 of the tool box in the manner hereinafter described. The hinged mounting shown in this embodiment consists of two spaced-apart brackets 38 which include sleeve portions 39 at the upper ends thereof, and the sleeves 39 thus rotatably receive the U-shaped hinge pin or bar 41. Also, screws 42 are shown to connect the ends of the bar 41 to the seat proper 37, and bolts 43 are shown to connect the hinge plates 38 to the box front member 27. It will be readily apparent that the seat 23 is thus swingable between a lowered position (not shown) and the raised position shown, such that in the lowered position, the seat portion 37 rests on the braces 36, and also the seat portion 37 is of a size to extend throughout the open top of the tool box 24 so that the seat serves as a top or cover for the box.

A seat back 46 is suitably attached to the seat portion 37 by means of the braces 47 which are connected between their respective ends to the seat portion 37 and the back 46 by means of the shown screws 48. Thus the back rest 46 is disposed with respect to the seat portion 37 such that upon swinging the seat 23 to the raised position, the back 46 abuts the steering wheel 13 and thus the entire seat 23 is retained in an over-center position against the steering wheel 13 when it is desired to have access to the tool box 24. At this time it will also be noted and understood that in the lowered position the seat portion 37 is therefore disposed slightly below the level of the top of the fenders 33 so that the latter can actually serve as both fenders and arm rest and they certainly provide the desired protection for the user occupying the seat.

While a specific embodiment of this invention has been shown and described, it will be obvious that certain changes could be made in the embodiment and the invention should therefore be limited only by the scope of the appended claims.

What is claimed is:

1. A combined seat, fenders, and tool box for a tractor or the like which includes two spaced-apart rear wheels, and a steering wheel disposed forwardly and above the upper level of said wheels, comprising a tool box attached to said tractor and being disposed in the space between said rear wheels, said box including an upright front wall and rear wall and two upwardly extending side walls and with all said walls defining an open top, a seat hingedly mounted on said front wall and extending throughout said open top in a cover position on said box and being hingedly movable between said cover position and an upper and forward position over-center with respect to its hinge for abutment with said steering wheel, and said side walls of said box extending in one piece laterally and above the level of said seat and extending over the tops of and terminating in the upright plane of the respective said rear wheels in the position of wheel fenders.

2. A combined seat, fenders, and tool box for a tractor or the like which includes two spaced-apart rear wheels, comprising a tool box attached to said tractor and being disposed in the space between said rear wheels, said box including an upright front wall and rear wall and upwardly extending side walls with all said walls being spaced apart to define an open top on said box, a seat movably mounted on said box and extending across said open top in the position of a cover on said box and said seat being movable to a position off said box, and each of said side walls of said box being in one piece and extending laterally of and above the level of said seat from the bottom of said box and extending over the tops of the respective said rear wheels and terminating in the upright planes thereof in position of wheel fenders.

3. A combined seat, fenders, and tool box for a tractor or the like which includes two spaced-apart rear wheels and a differential housing disposed axially between said rear wheels, comprising a tool box mounted on said tractor and including an uprightly disposed and spaced-apart front wall and rear wall extending from a lower edge on said housing and thereabove to upper edges of said walls and with said housing being the bottom of said box, a seat hingedly attached to said box and being of a size and disposed extending thereacross between said upper edges and being supported thereon for forming a cover on said box and being hingedly movable off said upper edges to an open position with respect to said box, said box including side walls with each extending in one piece from said differential housing to the level of said upper edges, and a fender connected to each of said side walls and extending upwardly and laterally therefrom and being disposed above said wheels in the position of a fender in the upright plane of and with respect to said wheels.

4. A combined seat, fenders, and tool box for a tractor or the like which includes two spaced-apart rear wheels, comprising a tool box mounted on said tractor between said wheels and including an uprightly disposed and spaced-apart front wall and rear wall with both extending to a horizontal plane and terminating in upper edges of said walls, spaced-apart support members included in said box and extending between said upper edges, a seat hingedly attached to said upper edge of said front wall of said box and extending between said upper edges in a seat portion and being supported on said support members in the position of a cover on said box, said seat including a back rest portion attached to said seat portion in braces extending from underneath said seat portion and upwardly to said back rest portion and with said braces extending over and in supporting contact with the said upper edge of said rear wall, said box including side walls with each extending in one piece to the level of said upper edges and said one piece extending laterally from and above said level to terminate in the upright plane of and above each adjacent one of said wheels in the position of a wheel fender, each of said side walls being attached to the adjacent one of said support members.

References Cited in the file of this patent

UNITED STATES PATENTS

| 2,010,062 | Baker et al. | Aug. 6, 1935 |
| 2,700,411 | Lamb | Jan. 25, 1955 |

FOREIGN PATENTS

| 1,165,485 | France | June 2, 1958 |